Sept. 17, 1935. M. D. O'BRIEN ET AL 2,014,630
BRAKE
Filed Sept. 23, 1930 2 Sheets-Sheet 2
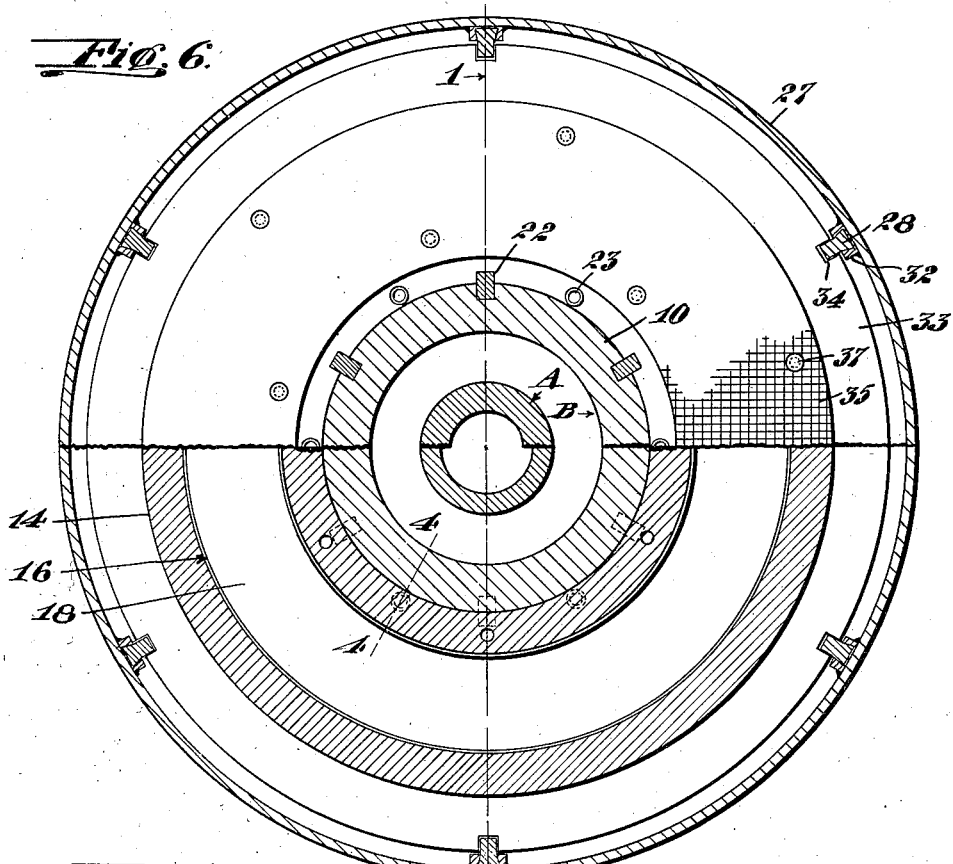
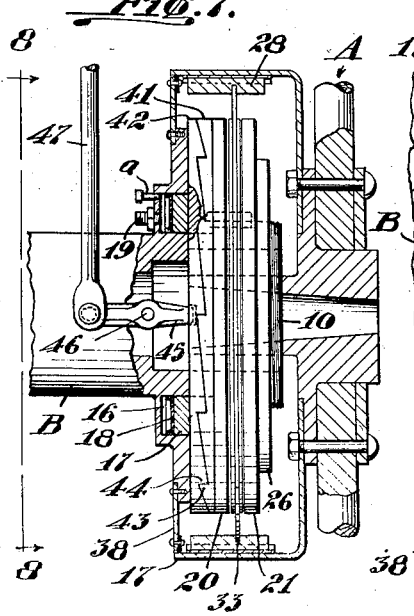
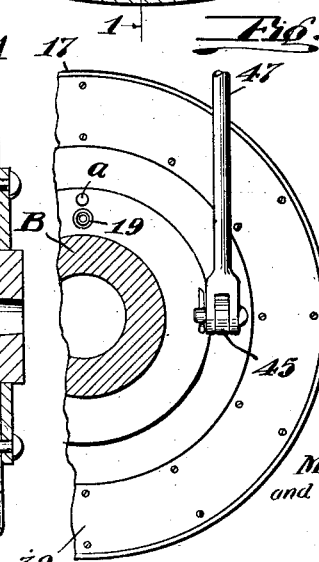
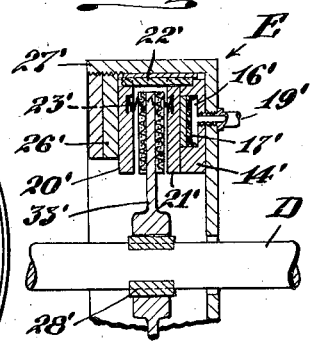
Inventors:
Matthew D. O'Brien
and John W. Burns;
By R. S. Berry
Atty.

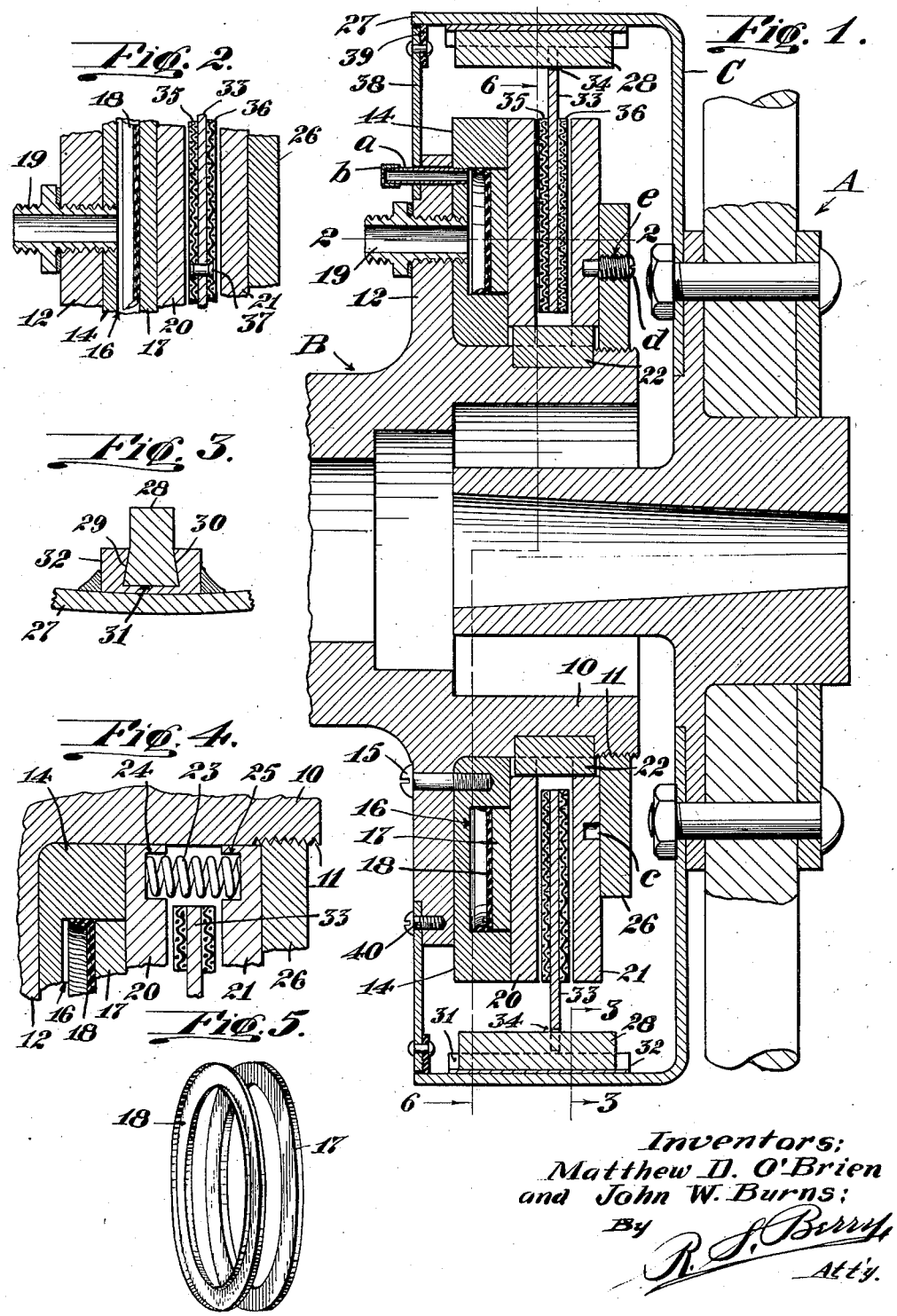

Patented Sept. 17, 1935

2,014,630

UNITED STATES PATENT OFFICE 2,014,630

BRAKE

Matthew D. O'Brien, Los Angeles, and John W. Burns, Culver City, Calif., assignors to Burns-O'Brien Disc Brake Corporation, Los Angeles, Calif., a corporation of California Application September 23, 1930, Serial No. 483,818

17 Claims. (Cl. 188—72)

This invention relates to improvements in brakes and more particularly pertains to brakes of the type embodying a plurality of flat friction disks or rings positoned in parallel relation to each other in normal spaced relation and adapted to be moved into a position such that adjacent disks or rings will be frictionally engaged to effect a braking action between a fixed and a relatively movable element on which the disks or rings are carried.

An object of the invention is to provide a brake of the above charcter which is especially applicable for use in effecting a braking action on the wheels of vehicles such as motor vehicles, aeroplanes and the like, but which is adapted to be employed in checking or stopping the rotation of a revoluble shaft or wheel where a brake of this type is suitable.

Another object is to provide a brake of the above character in which the parts are so formed and so mounted and arranged as to facilitate their construction and assemblage, whereby the wearing surfaces may be readily renewed, and whereby worn parts may be easily replaced.

Another object is to provide a brake of the above character which is especially adapted to be operated hydraulically and which, to this end, is fitted with an effective means whereby the friction disks or rings may be brought into operative frictional relation under the action of fluid pressure, embodying a construction whereby the fluid pressure will be distributed and applied uniformly throughout a continuous annular surface area of the side face of a ring or disk whereby the contiguous surfaces of the several friction rings or disks will be brought into frictional engagement with each other uniformly throughout their respective areas.

With the foregoing objects in view together with such other objects and advantages as may subsequently appear the invention resides in the parts and in the combination, construction and arrangement of parts or the equivalents thereof hereinafter described and claimed and illustrated by way of example in the accompanying drawings in which:

Figure 1 is a view in vertical section of the brake as seen on line 1—1 of Fig. 6, showing it as applied to the rear axle and wheel of a motor vehicle;

Fig. 2 is a detail in section taken on the line 2—2 of Fig. 1;

Fig. 3 is a detail in section as seen on the line 3—3 of Fig. 1;

Fig. 4 is a detail in cross-section taken on the line 4—4 of Fig. 6;

Fig. 5 is a perspective view of an annular piston employed in the construction shown in Fig. 1, showing it as detached;

Fig. 6 is a view of the brake as seen in section and elevation on the line 6—6 of Fig. 1 in the direction indicated by the arrows;

Fig. 7 is a view in section and elevation illustrating a modified form of the invention; and Fig. 8 is a fragmentary view in elevation as seen on the line 8—8 of Fig. 7.

Fig. 9 is a view in elevation and section showing the brake as applied to effect a braking action on a revoluble shaft.

Referring to the drawings more specifically A indicates generally a wheel constituting a revoluble element which may be mounted in any suitable manner, and B designates generally a stationary member associated with the wheel A and relatively to which the latter may revolve, and which member is here shown as comprising the rear axle housing of a motor vehicle, but which obviously may consist of a front axle or other structure between which and the wheel A the desired braking action is to be effected.

The member B is formed with a cylindrical end portion 10 having external threads 11 on its outer end portion, and projecting from the inner end portion of the cylinder 10 is an annular flange 12.

In the form of the invention shown in Figures 1 to 6 inclusive a metallic annulus 14 is demountably carried on the outer end portion of the member B, being here shown as abutting against the outer face of the flange 12 and as affixed to the latter by means of screws 15 whereby the annulus 14 is made a part of the member B. In some instances the annulus 14 may be formed integral with the member B but it is preferably detachably secured thereto to facilitate construction and repairs. The face of the annulus 14 projecting toward the outer end of the cylinder 10 is formed with an annular channel 16 in which is mounted for slidable movement toward and away from the bottom of the channel a crowding ring 17 between which and the bottom of the channel is interposed an annular cup-leather 18 for affording a fluid tight seal between the bottom of the channel 16 and the ring 17 so as to prevent the escape of fluid under pressure from the channel 16 around the margins of the ring.

A nipple 19 is screwed into registering openings in the flange 12 and annulus 14 and is adapted to be connected to any suitable source of fluid pressure supply as is common in hydraulic brake operating mechanism whereby fluid under pressure may be delivered into the channel 16 rearward of the cup leather 18 to effect outward movement of the ring 17.

Leading from the channel 16 is a bleeder pipe a which communicates with the uppermost portion of the channel and serves as a means whereby such air as may accumulate and become entrapped in the channel may be discharged as occasion may require; the outer end of the bleeder pipe being normally closed by a cap b threaded thereon and which cap is removed when it is desired to effect communication between the channel 16 and the atmosphere.

Encircling the cylinder 10 is a pair of spaced friction rings 20 and 21 which are splined on the cylinder by means of a series of keys 22 whereby the rings 20 and 21 are securely held against rotation on the member B yet are slidable longitudinally of the cylinder 10, and interposed between the rings 20 and 21 is a series of expansile springs 23 located adjacent the inner peripheries of the rings with their ends seated in recesses 24 and 25 formed on the contiguous faces of the latter, and which springs act to normally maintain the rings 20 and 21 in proper spaced relation to each other. The inner ring 20 normally abuts against the outer face of the annulus 14 and against the outer face of the crowding ring 17 and is adapted to be advanced toward the outer ring 21 by the piston.

The outer ring 21 normally abuts against a retaining nut 26 which is screwed on the threads 11 and which nut affords a means for adjusting the relative spacing of the friction rings 20 and 21 and also serves as a means for placing the several springs 23 collectively under tension. The provision of the nut 26 further provides a means for facilitating mounting and demounting of the friction rings; it constituting a single connection which may be readily put in place and removed. The nut 26 also provides a substantial backing for the outer ring 21, as it may overlie and contact a continuous annular surface area of the ring thereby imparting rigidity thereto and serving to securely hold the ring against displacement under the outward pressures imposed thereon during operation of the brake.

As a means for securing the nut 26 against displacement, the outer face of the plate 21 is formed with a series of sockets c disposed at suitable intervals apart in equal spaced distance from the axis of the ring and arranged to be covered by the nut 26 and a screw d is threaded into an internal threaded opening e in the nut and arranged so that the inner end thereof may be positioned in one of the sockets c; the ring 21 being held against rotation by reason of its engagement with the keys 22, the connection between the nut and the ring afforded by the screw d will effectively hold the nut against turning.

Carried on the wheel A is a drum C which embodies an annular wall 27 which is arranged to encircle the outer end portion of the member B in spaced relation to the cylinder 10, and mounted on the inner periphery of the wall 27 and extending parallel with the keys 22 is a series of keys 28 which are demountably affixed to the wall 27 so as to permit of their ready removal and replacement; each of the keys 28 being formed with diverging side walls 29 and 30 adapted to be engaged with the side walls of an open ended dovetail slot 31 formed in a block 32 affixed to the inner periphery of the wall 27 as shown in Fig. 3, on sliding the key longitudinally into said slot.

Interposed between the rings 20 and 21 is a friction ring 33 the outer margin of which is formed with notches 34 into which the keys 28 project to hold the ring 33 against rotative movement relatively to the drum C yet afford a splined connection between the drum and the ring 33 whereby the latter may be shifted transversely of the space between the friction rings 20 and 21. The inner periphery of the ring 33 is spaced from the cylinder 10 and clears the keys 22 so as to be capable of movement therearound.

The ring 33 is here shown as fitted with annular brake linings 35 and 36 which may consist of any suitable material and may be affixed to the ring 33 in any desired manner such as by rivets 37; this construction permitting of removal and replacement of the brake linings when excessively worn. The linings are formed and disposed to extend adjacent the contiguous surfaces of the rings 20 and 21 throughout the major portions thereof.

In some instances the brake linings 35 and 36 may be dispensed with, in which case the ring 33 is formed of a material of a different degree of hardness than that of the rings 20 and 21.

The contiguous faces of the rings 20 and 21 may be provided with renewable facings if so desired.

As a means for excluding water, dirt, and other foreign matter from the space enclosed by the drum C, an annular plate 38 is affixed to the flange 12 and projects to a point contiguous the outer margin of the annular wall 27 of the drum and is fitted with a wiper 39 which contacts the inner periphery of the wall 27 and serves as a seal for a clearance space provided between the outer edge of the plate 38 and the wall 27. The plate 38 is here shown as demountably attached to the flange 12 by a screw 40.

In assembling the brake, as previously described, the annulus 14, where separable from the flange 12, is positioned around the cylinder 10 and secured in place by the screws 15, and the nipple 19 and bleeder tube a are passed through registering openings in the flange and annulus and screwed into engagement with the latter as shown in Fig. 1 to effect the desired communication with the channel 16. The cup leather 18 and the crowding ring 17 are disposed in the channel 16 either before or after mounting of the annulus 14. The inner friction ring 20 is then put in place around the cylinder 10 and engaged with the keys 22, whereupon the springs 23 are positioned with their inner ends disposed in their recesses 24. The ring 33, detached from the drum C, is then disposed around the cylinder 10 and positioned contiguous the inner ring 20, whereupon the outer ring 21 is positioned around the cylinder 10 and in engagement with the keys 22. The nut 26 is then screwed in place to abut against the outer face of the ring 21 and is adjusted on its threaded connection with the cylinder 10 to effect the desired spacing of the rings 20 and 21 relatively to each other and to place the springs 23 under tension collectively, whereupon the nut is locked to the ring 21 by the screw d. The drum C, affixed to the wheel A, is then put in place by passing the annular wall 27 thereof over the outer periphery of the ring 33 with the keys 28 engaging the notches 34 in the ring 33; the wheel A being affixed to its mounting in the usual manner. The ring 38 with the wiper 39 thereon, is then put in place;

the ring 38 being formed in two pieces where necessary to apply it around the member B.

In the operation of the invention, as shown in Fig. 1, fluid pressure from any suitable source is directed in the chamber 16 from the nipple 19, thereby forcing the crowding ring together with inner ring 20, outwardly in opposition to the springs 23, thereby bringing the outer face of the ring 20 into contact with the ring 33 and crowding the latter against the ring 21, thereby effecting a frictional contact between the ring 33 and the rings 20 and 21 so as to effect a braking action to either retard, stop, or prevent rotation of the rotary member A carrying the braking ring 33. On releasing of the fluid pressure, the springs 23 will act to quickly restore the parts to normal thereby effecting prompt release of the brake.

In the form of the invention shown in Figs. 7 and 8, a pair of ratchet rings 41 and 42 are provided and are interposed between the crowding ring 17 and the ring 20, which ratchet rings are formed with interengaged ratchet teeth 43 and 44, respectively, on their contiguous faces adapted on rotation of one of the rings relatively to the other in one direction to effect separation of the rings. The ratchet ring 41 is rigidly affixed relatively to the braking ring 20 and the other ring 42 normally abuts against the flange 12 and is revolubly mounted on the cylinder 10. A rocker arm 45 pivoted at 46 has one end projected into a recess in the ratchet ring 42 and has its outer end connected to a reciprocal rod 47 through which the arm 45 may be rocked to cause the ratchet ring 42 to turn in such direction as to cause the teeth 44 thereon to ride upwardly on the teeth 43 and thereby force the ring 41 outwardly away from the ring 42 so as to cause the braking rings 20, 21, and 33 to cooperate in effecting a braking action in the manner previously described with reference to the form of the invention shown in Fig. 1. The ratchet rings 41 and 42 with their operating arm 45 and rod 47 serve as a means for operating the brake independent of the fluid pressure operated crowding ring 17, as an emergency brake or in event the fluid pressure system gets out of order.

The invention, as hereinbefore specifically described is applied in effecting a braking action between a wheel and a wheel mounting. It is also adapted to be employed in effecting a braking action on a rotary shaft, as illustrated, for example, in Fig. 9, in which D indicates a rotary shaft and E designates a drum affixed relatively to the shaft D. Splined on the shaft D by keys 28', is a braking ring 33' which extends between a pair of braking rings 20' and 21' splined by keys 22' to the inner periphery of an annular wall 27' embodied in the drum E. A nut 26' has threaded engagement with the inner periphery of the flange 27' and affords an abutment for the ring 20' and carried by the drum E is an annulus 14' which is formed with an annular channel 16' on which is mounted a crowding ring 17', against which the ring 21' normally abuts under the urge of springs 23'. The channel 16' has communication with a source of fluid pressure through a conduit 19'.

The operation of the form of the invention shown in Fig. 9, is the same as that described with reference to the construction shown in Fig. 1; the ring 21' being adapted to be advanced by the crowding ring 17' under the action of fluid pressure on the latter to effect frictional engagement of the ring 33' and the rings 20' and 21', and thereby act to retard, stop, or prevent rotation of the shaft D.

By the provision of the crowding ring 17 or 17' bearing against one side of its associated friction ring, pressure imposed on the piston will be directed to the friction ring throughout a continuous annular area of one side thereof, thereby imparting equal pressure throughout the ring.

By constructing a brake in accordance with this invention, the brake after once being assembled, will require little or no adjustment to compensate for wear and a brake of long life is insured as the braking surface will wear uniformally and may be worn to extreme thinness before requiring replacement.

We claim:

1. In a brake, the combination, with a fixed member and a relatively revoluble member of a friction ring splined on said revoluble member, a pair of friction rings splined directly on said fixed member disposed on opposite sides of said first named friction member, springs normally maintaining said pair of friction rings in spaced relation to each other and out of frictional contact with the ring interposed therebetween, a pair of abutments for limiting movement of said pair of rings away from each other under the urge of said springs, one of said abutments having direct screw connection with said fixed member for adjustment thereon to regulate the relative position of said pair of rings and to place said springs collectively under tension, and means for advancing one of said pair of rings relatively to the other in opposition to said springs independent of said adjustable abutment.

2. In a brake, the combination, with a fixed member and a relatively revoluble member of a friction ring splined on said revoluble member, a pair of friction rings splined directly on said fixed member disposed on opposite sides of said first named friction member, springs normally maintaining said pair of friction rings in spaced relation to each other and out of frictional contact with the ring interposed therebetween, a pair of abutments for limiting movement of said pair of rings away from each other under the urge of said springs, said abutments contacting continuous annular surface portions of the outer faces of said rings, one of said abutments having direct screw engagement with said fixed member for adjustment thereon to regulate the relative position of said pair of rings and to place said springs collectively under tension, and means independent of said screw engaged abutment for placing said rings into frictional engagement in opposition to said springs.

3. In a brake, the combination, with a fixed member and a relatively revoluble member of a friction ring splined on said revoluble member, a pair of friction rings splined directly on said fixed member disposed on opposite sides of said first named friction member, springs normally maintaining said pair of friction rings in spaced relation to each other and out of frictional contact with the ring interposed therebetween, a pair of annular abutments for limiting movement of said pair of rings away from each other under the urge of said springs arranged to seat against the outer faces of said rings, one of said abutments having screw engagement with said fixed member for adjustment longitudinally thereof to regulate the relative position of said pair of rings and to place said springs collectively under tension, and fluid pressure operated means for advancing one of said pair of rings relatively to the other in opposition to said springs, including a crowding ring bearing against one side of one of said pair of rings independent of its associated abutment.

4. In a brake, a cylinder, a pair of spaced rings splined on said cylinder for movement longitudinally of the latter relatively to each other, springs interposed between said rings yieldably opposing movement thereof toward each other, a friction ring interposed between said pair of rings and revoluble relatively thereto, an abutment fixed on said cylinder adjacent one of said pair of spaced rings, a nut screwed on said cylinder for adjusting said pair of rings relatively to each other and serving as an abutment for the other of said spaced rings, and means independent of said nut for placing said rings in frictional engagement with each other in opposition to said rings.

5. In a brake, a plurality of relatively movable, parallel braking rings, yieldable means normally maintaining said rings out of frictional contact with each other, a crowding ring positioned to operate against one side of one of said rings throughout a continuous annular surface portion thereof, means for shifting said crowding ring to effect relative movement of said braking rings to position contiguous surfaces of adjacent braking rings in frictional contact with each other, a pair of interengaged relatively turnable ratchet rings interposed between said crowding ring and its contiguous ring one of which ratchet rings is fixed relatively to said rings, and means for effecting turning of the other ratchet ring to cause relative movement of said braking rings independent of said crowding ring.

6. A brake embodying a pair of spaced friction rings, a support for said rings, a splined connection between said rings and said support for holding said rings against rotation on said support yet permitting movement of said rings toward and away from each other, tensioned means yieldably opposing movement of said rings toward each other, a fixed abutment on said support for limiting movement of one of said rings in one direction, a retaining nut carried on said support against which the other of said rings abuts for limiting movement of said ring in one direction, an intermediate friction ring interposed between said pair of friction rings, a support for said intermediate friction ring, a splined connection between said intermediate friction ring and its support permitting movement of said ring transversely of the space between said pair of rings, and means for advancing one of said pair of rings toward the other of said rings in opposition to said tension means and for placing the opposite faces of said intermediate ring in frictional engagement wth the contiguous faces of said pair of rings.

7. In a brake, a pair of spaced parallel friction rings, a support on which said rings are mounted for slidable movement toward and away from each other, springs interposed between said rings for maintaining said rings spaced apart and exerting yieldable pressures against the inner faces of each of said rings, a pair of annular abutments against which the outer faces of said rings seat under the urge of said springs, one of said abutments being fixed on said support, and the other of said abutments having detachable screw threaded connection with said support, means for detachably connecting the last named abutment to the ring adjacent thereto, a friction ring interposed between said pair of rings mounted for lateral movement therebetween, and means for advancing one of said pair of rings toward the other in opposition to said springs.

8. A brake embodying a pair of spaced friction rings, a support for said rings, a splined connection between said rings and said support for holding said rings against rotation on said support yet permitting movement of said rings toward and away from each other, tensioned means yieldably opposing movement of said rings toward each other, a fixed abutment on said support for limiting movement of one of said rings in one direction, a movable abutment carried on said support against which the other of said rings abuts for limiting movement of said ring in one direction, means for holding said movable abutment in various positions on said support, means for interconnecting said moveable abutment and the ring adjacent thereto, an intermediate friction ring interposed between said pair of friction rings, a support for said intermediate friction ring, a splined connection between said intermediate friction ring and its support permitting movement of said ring transversely of the space between said pair of rings, and means for advancing one of said pair of rings toward the other of said rings in opposition to said tension means and for placing the opposite faces of said intermediate ring in frictional engagement with the contiguous faces of said pair of rings.

9. In a brake, a pair of spaced parallel friction rings, a support for said rings, a splined connection between said rings and said support, springs yieldably urging said rings apart, a pair of annular abutments limiting outward movement of said rings under the urge of said springs, one of said abutments being demountably attached to said support by screw threaded engagement therewith and shiftable longitudinally thereof to dispose said abutment at various fixed positions on said support, means for detachably connecting said last named abutment to the adjacent ring to hold said abutment against turning on said support, a laterally moveable intermediate friction ring interposed between said pair of friction rings, and means for advancing one of said pair of rings toward the other of said rings in opposition to said springs and for placing the opposite faces of said intermediate ring in frictional engagement with the adjacent faces of said pair of rings.

10. In a brake, a cylindrical support having a screw threaded end portion, a plurality of spaced friction rings encircling said support, and supported thereon for movement longitudinally thereof, means for holding said rings against rotation relative to said support, a nut screwed on the threaded end of said support against which one of said rings abuts, said last named ring being formed with a series of sockets, and a screw carried by said nut engageable with one of said sockets to hold said nut against turning on said support.

11. In a brake, a cylinder having an outer end portion formed with screw threads, an abutment ring secured on said screw threads for adjustment longitudinally of said cylinder, a crowding ring encircling said cylinder in spaced relaton to said abutment ring movable longitudinally of said cylinder, and an assembly of friction rings interposed between said crowding and abutment rings.

12. In a brake, a cylinder having an outer end portion formed with screw threads, an abutment ring secured on said screw threads for adjustment longitudinally of said cylinder, a crowding ring encircling said cylinder in spaced relation to said abutment ring movable longitudinally of said cylinder, an assembly of friction rings interposed between said crowding and abutment rings, and means for releasably holding said abutment ring against turning on said screw threads.

13. In a brake, a cylinder, spaced rings splined on said cylinder for movement longitudinally of the latter relative to each other, a friction ring interposed between said spaced rings and revoluble relatively thereto, means for normally holding said rings out of frictional engagement with each other, an abutment ring screwed on said cylinder for adjustment longtudinally thereof serving as an adjustable abutment at one end of the ring assembly, and means at the other end of said ring assembly for advancing said rings into frictional engagement with each other.

14. In a brake, a cylinder, spaced rings splined on said cylinder for movement longitudinally of the latter relative to each other, a friction ring interposed between said spaced rings and revoluble relatively thereto, means for normally holding said rings out of frictional engagement with each other, an abutment ring screwed on said cylinder for adjustment longitudinally thereof serving as an adjustable abutment at one end of the ring assembly, means at the other end of said ring assembly for advancing said rings into frictional engagement with each other, and means for holding said abutment ring against accidental turning on said cylinder.

15. In a brake, a cylinder having an outer end portion formed with screw threads, an abutment ring screwed on said screw threads for adjustment longitudinally of said cylinder, a crowding ring encircling said cylinder and movable longitudinally thereof in spaced relation to said abutment ring, an assembly of friction rings encircling said cylinder and interposed between said crowding ring and abutment ring, and a plurality of springs interposed between said crowding ring and abutment ring yieldably opposing advance movement of said crowding ring towards said abutment ring and adapted to be collectively placed under tension by advancing said abutment ring toward said crowding ring.

16. In a brake, a cylinder having an outer end portion formed with screw threads, an abutment ring screwed on said screw threads for adjustment longitudinally of said cylinder, a crowding ring encircling said cylinder and movable longitudinally thereof in spaced relation to said abutment ring, an assembly of friction rings encircling said cylinder and interposed between said crowding ring and abutment ring, a plurality of springs interposed between said crowding ring and abutment ring yieldably opposing advance movement of said crowding ring towards said abutment ring and adapted to be collectively placed under tension by advancing said abutment ring toward said crowding ring, and means for releasably locking said abutment ring relative to said cylinder.

17. In a brake, the combination with a fixed member and a relatively revoluble member, of a pair of friction rings splined directly on said fixed member in spaced parallel relation to each other, springs interposed between said friction rings yieldably opposing movement of said rings toward each other, a fixed abutment for one of said rings for limiting movement thereof under the urge of said springs and relative to which said ring is movable in a direction away from said abutment, a second fixed abutment for the other of said rings to limit movement thereof under the urge of said springs, a connection between said second fixed abutment and said fixed member operable to positively advance and retract said abutment longitudinally of said fixed member to regulate the spacing between said rings and to regulate the tension of said springs, means for effecting movement of one of said rings relatively to the other in opposition to said springs independent of said abutments, and a friction ring interposed between said pair of rings having splined connection to said rotary member.

MATTHEW D. O'BRIEN.
JOHN W. BURNS.